United States Patent [19]

Kramer et al.

[11] Patent Number: 5,066,321
[45] Date of Patent: Nov. 19, 1991

[54] DEVICE FOR POSITIONING HOT GLASS SHEETS

[75] Inventors: Joseph O. Kramer, Toledo; Dexter H. McMaster, Perrysburg, both of Ohio; Eustace H. Mumford, Ottawa Lake, Mich.

[73] Assignee: Glasstech, Inc., Perrysburg, Ohio

[21] Appl. No.: 554,373

[22] Filed: Jul. 19, 1990

[51] Int. Cl.$^5$ ............................................. C03B 35/24
[52] U.S. Cl. .................................. 65/182.2; 65/273; 65/289; 294/64.3; 294/65
[58] Field of Search ..................... 65/106, 163, 182.2, 65/273, 289; 294/64.3, 65

[56] References Cited

U.S. PATENT DOCUMENTS 4,767,437  8/1988  Lampman et al. .................. 65/273

*Primary Examiner*—Joye L. Woodard
*Attorney, Agent, or Firm*—Brooks & Kushman

[57] ABSTRACT

A positioning device (10) is disclosed for catching a hot glass sheet (12) without relative motion between the glass sheet (12) and positioning device (10) as it arrives at a topside support device (14) in a glass sheet heating furnace (18). The positioning device (10) includes a first actuator (30) for actuating longitudinal movement of the glass sheet (12) and a second actuator (32) for actuating transverse movement of the glass sheet (12) for decelerating, and positioning the glass sheet (12) during deceleration, to an accurate stationary position relative to the topside support device (14).

13 Claims, 3 Drawing Sheets

DEVICE FOR POSITIONING HOT GLASS SHEETS

TECHNICAL FIELD

This invention relates to glass sheet processing apparatus and has particular utility for catching and accurately registering glass sheets on a topside support surface.

BACKGROUND ART

In a conventional glass sheet bending system including a furnace having a bending section and a topside support device, a glass sheet is received by the topside support device which includes a downwardly facing surface for receiving the glass sheet prior to release onto a glass sheet shaping tool such as a lower mold used for forming the glass sheet. The glass sheet is supported on the topside support device prior to being deposited onto the lower mold.

Pressurized gas is used to prevent surface-to-surface contact and to assist in conveying the glass sheet. Inertia of the glass sheet moving in a plane of conveyance in the furnace provides movement of the glass sheet supported on the topside support device. Because of the relative velocity of the glass sheet, the glass sheet experiences an abrupt engagement as it is brought to an at rest position on the topside support device. In one arrangement, a mechanical stop is mounted on the topside support device to restrain the moving glass sheet. The abruptness of the engagement often causes the glass sheet to bounce off the stop. Thereafter a back gate assembly is moved into position at the upstream end of the glass sheet to hold the glass sheet in its at rest position.

In another embodiment, a mold as taught in U.S. Pat. No. 4,775,404 having a plurality of glass sheet locators is used to stop and position the glass sheet for subsequent registration with the mold surface. The vacuum drawn by the topside support platen is terminated and the glass sheet is deposited on the lower mold below the topside support device.

Such mold apparatus is expensive and requires extensive maintenance. When bending glass sheets for subsequent lamination, time consuming manual adjustment of the glass sheet locators must be made so that two differently sized glass sheets, one inner and one outer, can be bent to the same shape for subsequent lamination. When the mechanical stops are used with an air float conveyor, the heat induced growth of glass restraining bars inhibit the accuracy of alignment of the glass sheets on the topside support device.

DISCLOSURE OF THE INVENTION

An object of the present invention is to provide a positioning device to catch a moving, heated glass sheet and controllably bring it to an at rest position.

Another object of the invention is to provide a positioning device to accurately align the heated glass sheet on a topside support device for subsequent accurate registration on a shaping mold.

Still another object of the invention is to provide a positioning device to eliminate the complex tooling required to align a glass sheet on a shaping mold.

A further object of the invention is to provide a positioning device that is computer controlled to automatically compensate for bending differently sized glass sheets for subsequent lamination.

In carrying out the above objects and other objects of the invention, a device for positioning a hot glass sheet on a topside support device in a glass sheet processing apparatus is provided. The glass sheet processing apparatus includes a conveyor of the air support or roller type for conveying a glass sheet for heating in a heating chamber. The topside support device has a downwardly facing planar surface located adjacent and extending away from the heating conveyor at an elevation just slightly above a plane of conveyance of the glass sheet during heating for receiving the heated glass sheet from the heating conveyor and supporting the glass sheet by vacuum and pressure without engagement on the topside support device.

The positioning device constructed in accordance with the present invention includes a pair of laterally spaced independently operable glass sheet locators fixedly mounted relative to the topside support device. Each glass sheet locator includes mechanical linkage having a glass sheet catcher movably mounted in the plane of conveyance below the topside support device for engaging the heated glass sheet at about the same speed which the glass is traveling so as to minimize relative motion between the catcher and the glass sheet as it arrives at the topside support device from the heating conveyor. Each locator includes a first actuator for actuating lateral movement of the glass sheet catcher via the mechanical linkage and also a second actuator for actuating transverse movement of the glass sheet catcher via the mechanical linkage. The glass sheet locators decelerate the conveyed glass sheet, independently if necessary, from its velocity along the heating conveyor, after the engagement, to an accurate stationary position on the topside support device for subsequent deposition onto a shaping mold.

In the preferred embodiment of the invention the catcher is defined by a plurality of thin wheels rotatable about a vertical axis for engaging an edge of the glass sheet with rolling contact. A support mounted on the topside support device provides additional support for the mechanical linkage. The mechanical linkage includes a roller rotatable about a horizontal axis mounted on the mechanical linkage to maintain spacing of the catcher from the downwardly facing surface of the topside support device and also to provide rolling contact of the mechanical linkage with the downwardly facing surface of the topside support device. The mechanical linkage further includes antifriction elements, most preferably rollers, for engaging the support in rolling engagement.

Preferably the first and second actuators are ball screw drive assemblies. A rack and pinion assembly mounted on each locator synchronizes movement and cooperates with the actuators and eliminates the possibility of the linkage going askew during positioning. A controller controls the independent operation of the first and second actuators. This independent control allows the glass sheet to be rotated if necessary. Most preferably, the controller is a micro processor.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
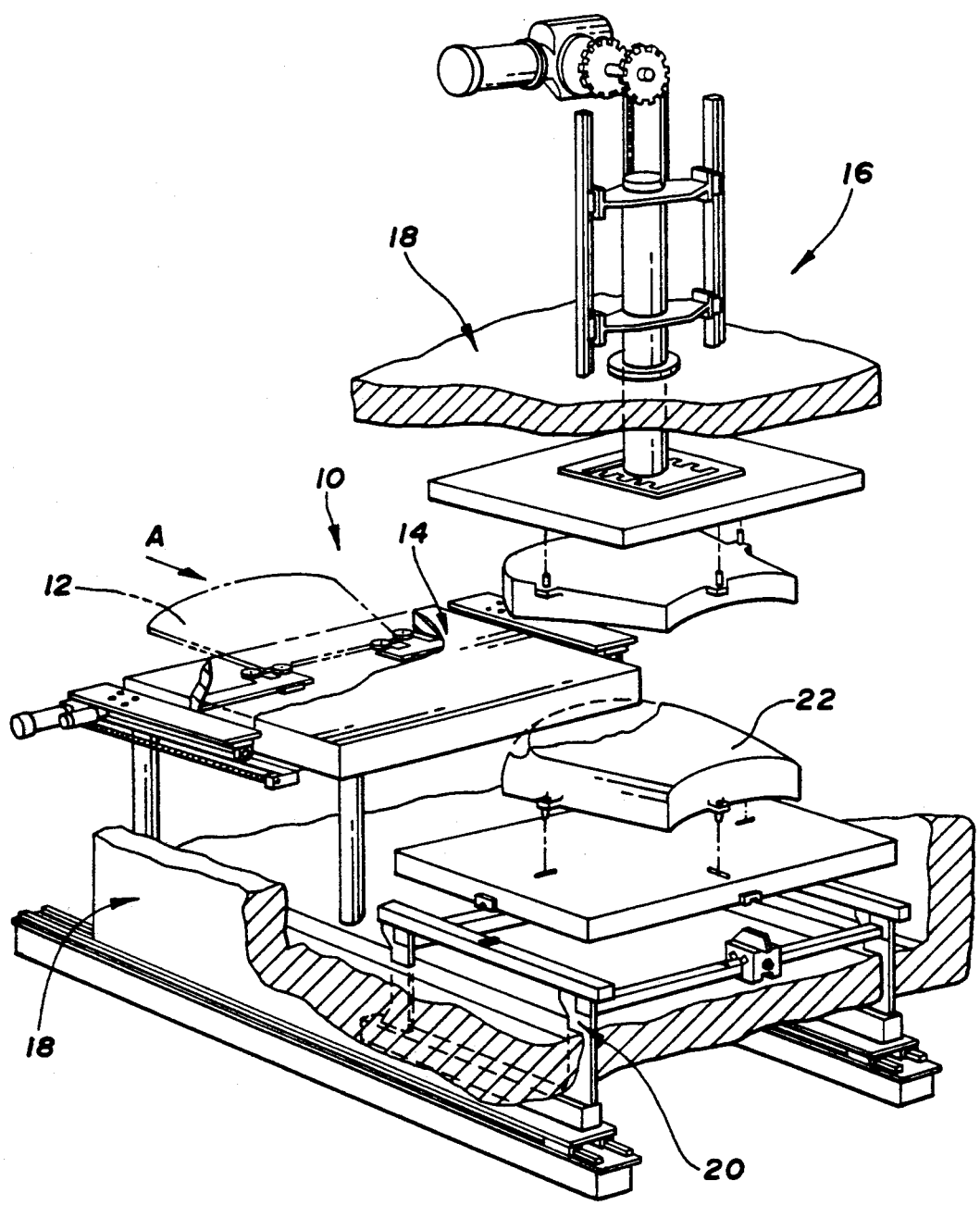
FIG. 1 is perspective view of a device for positioning hot glass sheets constructed in accordance with the present invention illustrated in an environment consisting of a bending section of a glass sheet heating furnace.

Referring to FIG. 1 of the drawings, a device for positioning hot glass sheets constructed in accordance with the present invention is generally indicated by reference numeral 10 and is used to catch a moving, heated glass sheet 12 and controllably bring it to an at rest position beneath a downwardly facing surface of a topside support device 14. Topside support device 14 is part of integral bending section 16 of a glass sheet heating furnace 18. Bending section 16 includes a mold shuttle 20 shuttleable between topside support device 14 and bending section 16. The positioning device 10 locates the glass sheet 12 beneath the topside support device 14 for subsequent accurate registration on a glass sheet shaping tool 22 mounted on shuttle 20.

A conventional glass sheet conveyor, schematically shown, is located adjacent the topside transfer device 30 and conveys glass sheet 12 through furnace 18 for heating. Preferably, the conveyor is of the air support type wherein glass sheet 12 is supported on a floatation bed of upwardly directed air. This floatation bed is angled downwardly in a direction of glass sheet conveyance indicated by arrow A to thereby allow gravity to move glass sheet 12 in the plane of conveyance. Topside support device 14 has a downwardly facing planar surface located adjacent and extending away from the conveyor at an elevation just slightly above the plane of conveyance of the glass sheet. In the preferred embodiment shown, topside support device 14 receives the heated glass sheet 12 from the heating conveyor and supports the glass sheet by vacuum and pressure without engagement on the topside support device. In an alternative arrangement, not shown, the positioning device 10 is mounted on either side of the conveyor and is used without the topside support device 14. In this alternative arrangement, glass sheet 12 is supported only from below by the air float conveyor for positioning thereon.

Figure 2:
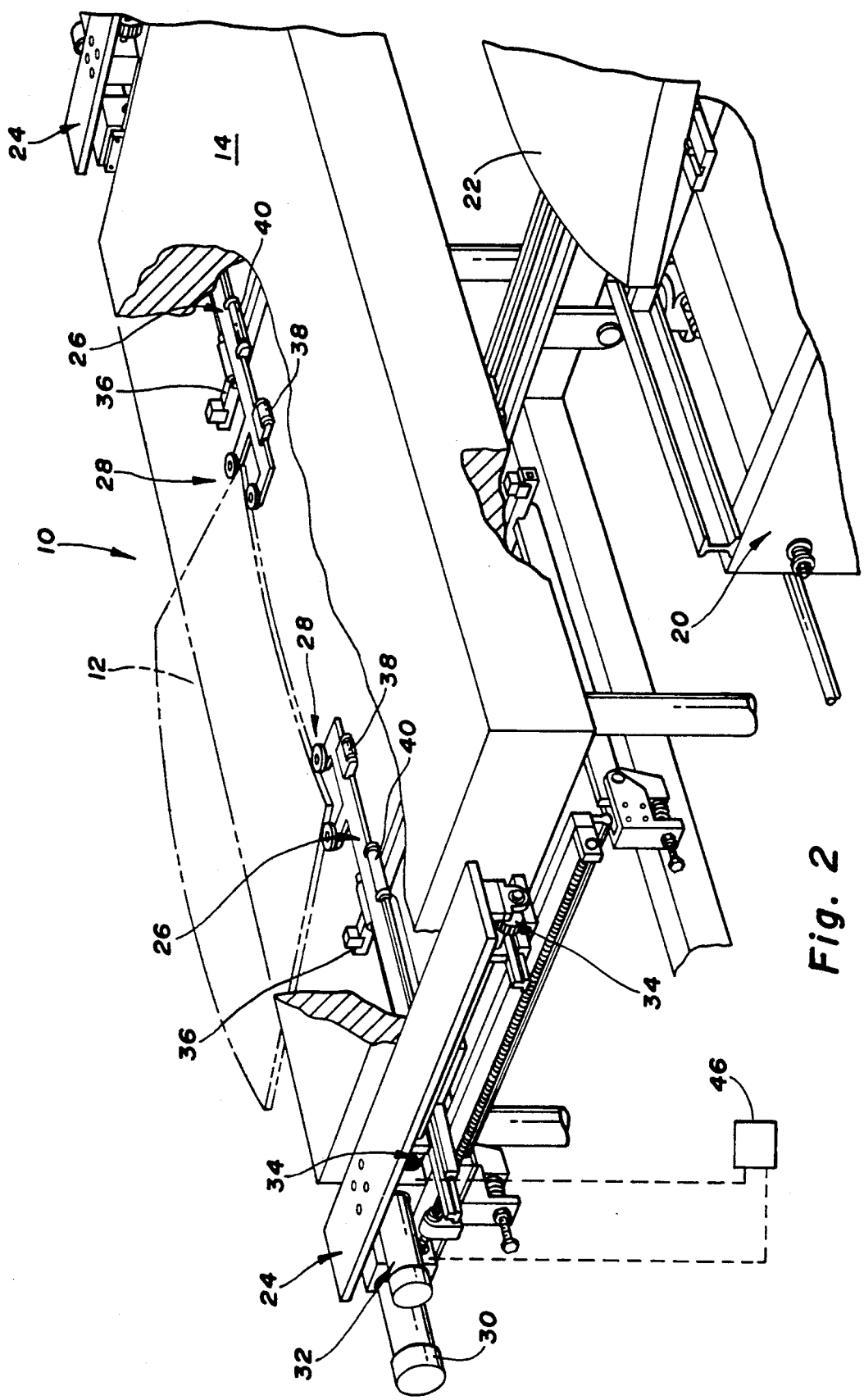
FIG. 2 is an enlarged partially cut away perspective view illustrating the positioning device and a topside support device.

As illustrated in FIG. 2, positioning device 10 includes a pair of laterally spaced glass sheet locators 24 fixedly mounted relative to the topside support device 14. Each glass sheet locator 24 is independently operable and includes mechanical linkage 26 having a glass sheet catcher 28 movably mounted below the topside support device 14 in the plane of conveyance of the glass sheet 12 for engaging the heated glass sheet at about the same speed the glass sheet is being conveyed at so as to minimize relative motion between the catcher and glass sheet as it arrives at the topside support device. Each locator 24 includes a first actuator 30 for actuating longitudinal movement of the glass sheet catcher 28 and a second actuator 32 for actuating transverse movement of the glass sheet catcher. First and second actuators 30,32 control the movements of linkage 26 and decelerate the glass sheet 12 after engaging the moving glass sheet as it arrives at the topside support device 14. Each locator 24 can be independently operated so that rotational adjustments of the glass sheet can be made during deceleration through differentials in movement of linkage 26. Positioning device 10 positions glass sheet 12 during its deceleration bringing the glass sheet to an accurate stationary position relative to the topside support device 14.

With a continued reference to FIG. 2 of the drawings, catcher 28 is defined by a plurality of thin wheels rotatable about a vertical axis for engaging an edge of the glass sheet with rolling contact. A support 36 is mounted on the topside support device 14 for supporting the cantilevered mechanical linkage 26 near the plane of conveyance at all times. Preferably, support 36 is a silicon carbide bar which resists heat induced growth associated with metal components. Mechanical linkage 26 includes a roller 38 rotatable about a horizontal axis mounted on the linkage to maintain spacing of catcher 28 from the downwardly facing surface of the topside support device 14. Rollers 38 also provide rolling contact with the downwardly facing surface of the topside support device 14 which enables a smooth deceleration of hot glass sheet 12.

Mechanical linkage 26 also includes antifriction elements 40 defined by elongated rollers which engage support 36 in rolling contact to facilitate movement of the linkage along the support.

As seen in FIG. 2 of the drawings, first actuator 30 is a ball screw drive assembly which is actuable for rapidly and controllably moving the linkage 26 longitudinally with respect to the direction of glass sheet conveyance. Second actuator 32 is also a ball screw assembly operable for moving the linkage 26 in the transverse direction with respect to the direction of glass sheet conveyance. A dual rack and pinion assembly 34 is mounted on each locator 24 to synchronize movement of the locator and prohibit skewing of the locator during movement.

A controller 46 is operable for independently controlling the operation of the first and second actuators 30,32. Most preferably, controller 46 is a microprocessor which can, through feedback loops, read the velocity of glass sheet 12 as it approaches topside support device 14 and control first actuator 30 so that the glass sheet is engaged by the positioning device 10 with minimum relative velocity and subsequently control second actuator 32 so that the glass sheet is brought to an accurate at rest position by the end of its deceleration. Controller 46 also automatically compensates to change end points of two differently sized glass sheets which are to be laminated after bending.

Operation of the Invention

Figure 3A:
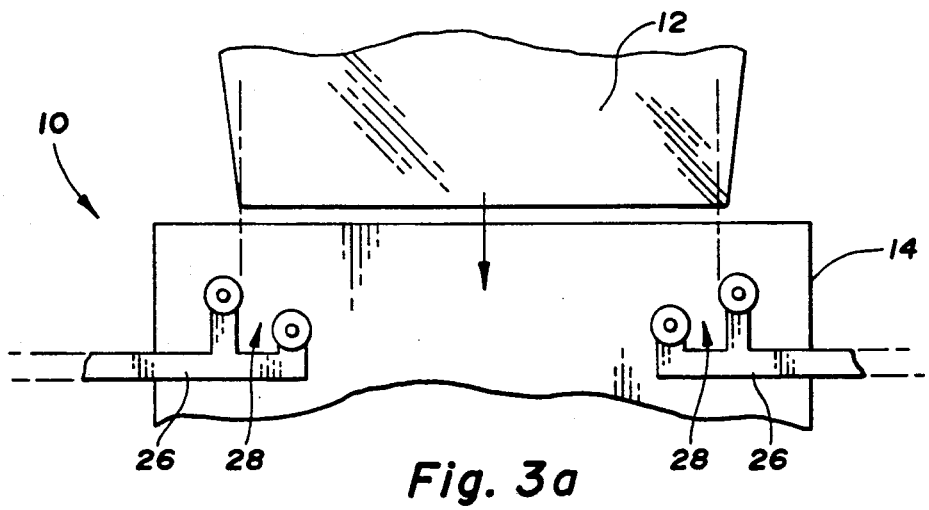
FIGS. 3a through 3c are schematic plan views of the positioning device illustrating a glass sheet and a sequence of movements of the positioning device positioning the glass sheet laterally, transversely and rotationally in a horizontal plane at a pre-programmed position.
Figure 3B:
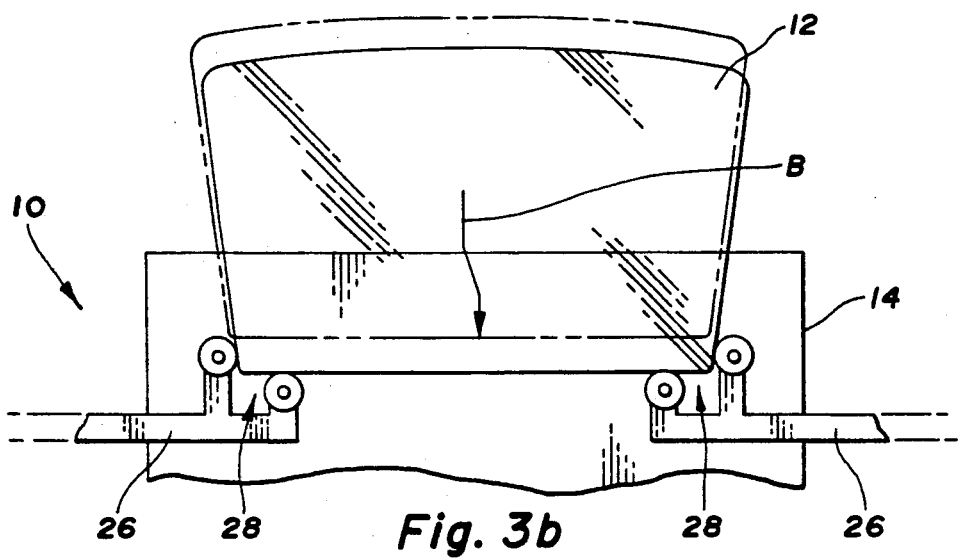
Figure 3C:
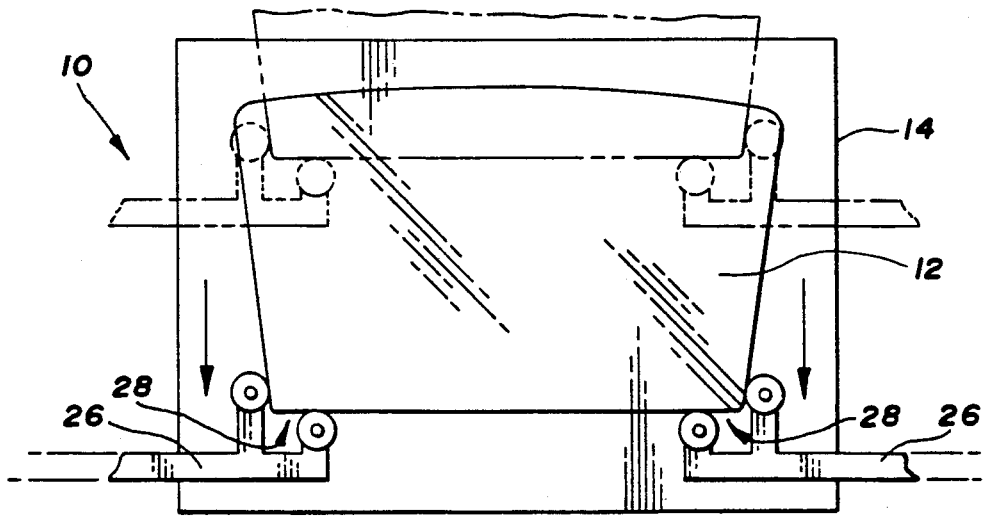

Drawing FIGS. 3A through 3C illustrate a sequence of operation of the positioning device 10. In FIG. 3A, glass sheet 12 is approaching topside support device 14 while being supported on a heating conveyor. At this point, glass sheet 12 has sufficient velocity provided by gravity if heating conveyor is of the air support type or by rollers, if heating conveyor is a roller conveyor. As glass sheet 12 is about to engage with catchers 28, controller 46 actuates the ball screw drive assembly of first actuator 30 so that as glass sheet 12 is engaged with catchers 28 with minimum relative velocity.

FIG. 3B illustrates that while glass sheet 12 is being decelerated, controller 46 controls the ball screw assembly of second actuator 32 to adjust the lateral positioning of the glass sheet as indicated by arrow B.

In FIG. 3C, glass sheet 12 is illustrated after being brought to a pre-programmed stationary position relative to topside support device 14 for subsequent deposition onto shaping tool 22, illustrated in phantom in FIG. 1. Glass sheet 12 is then accurately deposited on shaping tool 22 and thereby providing for consisting of bending and reproducibly of the bent shape during a production operation.

While the best mode for carrying out the invention has been described in detail, those familiar with the art to which this invention relates will recognize various alternative designs and embodiments for practicing the invention as defined by the following claims.

What is claimed is:

1. In a glass sheet processing apparatus including a conveyor for conveying a glass sheet for heating, a support device adjacent and extending away from the conveyor for receiving the heated glass sheet from the conveyor and supporting the glass sheet by vacuum and pressure, a device for positioning the hot glass sheet on the support device, the device comprising: a pair of laterally spaced glass sheet locators fixedly mounted relative to the support device; each glass sheet locator including mechanical linkage having a glass sheet catcher movably mounted in the plane of conveyance for engaging the heated glass sheet without relative motion between said catcher and glass sheet as it arrives at the support device; and each locator including a first actuator for actuating longitudinal movement and a second actuator for actuating transverse movement of said glass sheet catcher via said linkage for decelerating and positioning the glass sheet at an accurate stationary position relative to the support device.

2. In a glass sheet processing apparatus including a conveyor for conveying a glass sheet for heating, a topside support device having a downwardly facing planar surface located adjacent and extending away from the conveyor at an elevation just slightly above a plane of conveyance of the glass sheet during heating for receiving the heated glass sheet from the conveyor and supporting the glass sheet by vacuum and pressure without engagement on the topside support device, a device for positioning the hot glass sheet on the topside support device, the device comprising: a pair of laterally spaced glass sheet locators fixedly mounted relative to the topside support device; each glass sheet locator including mechanical linkage having a glass sheet catcher movably mounted below the topside support device in the plane of conveyance for engaging the heated glass sheet without relative motion between said catcher and glass sheet as it arrives at the topside support device; and each locator including a first actuator for actuating longitudinal movement and a second actuator for actuating transverse movement of said glass sheet catcher via said linkage for decelerating and positioning the glass sheet at an accurate stationary position relative to the topside support device.

3. A device as in claim 2 wherein said catcher is defined by a plurality of thin wheels rotatable about a vertical axes for engaging an edge of the glass sheet with rolling contact.

4. A device as in claim 2 wherein said mechanical linkage includes a roller rotatable about a horizontal axis mounted thereon to maintain spacing of said catcher from the downwardly facing surface of the topside support device and also to provide rolling contact of said mechanical linkage with the downwardly facing surface of the topside support device.

5. A device as in claim 2 further including a support mounted on the topside support device for supporting said mechanical linkage.

6. A device as in claim 5 wherein said mechanical linkage further includes antifriction elements which contact said support.

7. A device as in claim 6 wherein said antifriction elements are elongated rollers for engaging said support in rolling engagement.

8. A device as in claim 2 wherein said first actuator is a ball screw drive assembly.

9. A device as in claim 2 wherein said second actuator is a ball screw drive assembly.

10. A device as in claim 2 further including a controller for independently controlling said first and second actuators.

11. A device as in claim 10 wherein said controller is a micro processor.

12. In a glass sheet processing apparatus including a conveyor for conveying a glass sheet for heating, a topside support device having a downwardly facing planar surface located adjacent and extending away from the conveyor at an elevation just slightly above a plane of conveyance of the glass sheet during heating for receiving the heated glass sheet from the conveyor and supporting the glass sheet by vacuum and pressure without engagement on the topside support device, a device for positioning the hot glass sheet on the topside support device, the device comprising: a pair of computer controlled laterally spaced independently operable glass sheet locators fixedly mounted relative to the topside support device; each glass sheet locator including mechanical linkage having a glass sheet catcher movably mounted below the topside support device in the plane of conveyance for engaging the heated glass sheet without relative motion between said catcher and glass sheet as it arrives at the topside support device; said catchers engaging the glass sheet with rolling contact; and each locator including independent actuator means for actuating longitudinal and transverse movements of said glass sheet catchers via said linkage for decelerating and positioning the glass sheet at an accurate stationary position relative to the topside support device.

13. A device as in claim 12 wherein said actuator means includes a first actuator for actuating the lateral movement and a second actuator for actuating the transverse movement of said glass sheet catcher via said linkage for decelerating and positioning the glass sheet at an accurate stationary position relative to the topside support device.

* * * * *